Aug. 6, 1957                J. E. HALL, SR                2,801,715
METHOD OF PLACING CEMENT BRIDGES OR FILMS IN OIL WELLS
Filed March 27, 1953                              3 Sheets-Sheet 1

INVENTOR.
Jesse E. Hall, Sr.
BY
ATTORNEY.

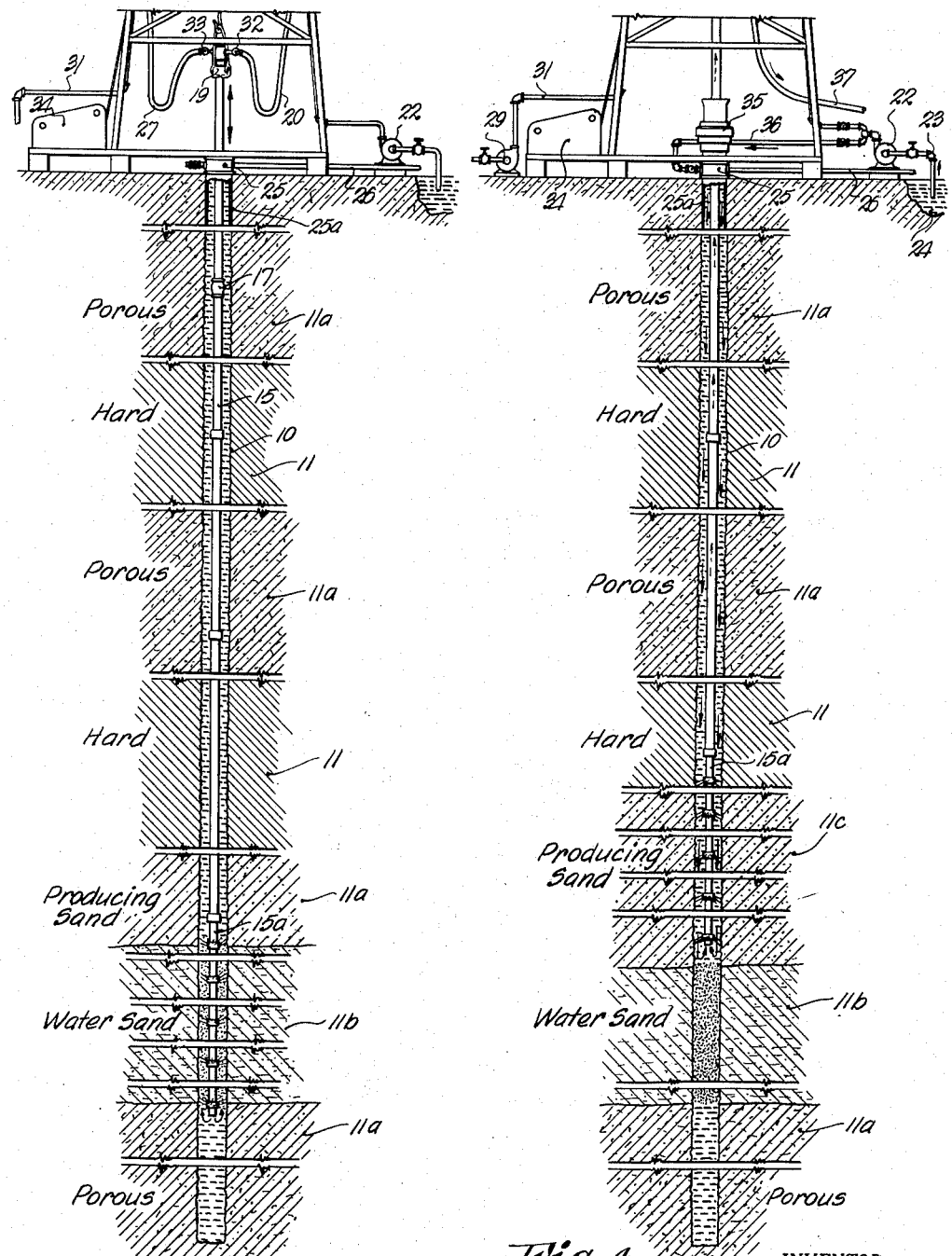

INVENTOR.
Jesse E. Hall, Sr.
BY
ATTORNEY.

United States Patent Office 2,801,715
Patented Aug. 6, 1957

2,801,715

METHOD OF PLACING CEMENT BRIDGES OR FILMS IN OIL WELLS

Jesse E. Hall, Sr., Weatherford, Tex.

Application March 27, 1953, Serial No. 345,071

1 Claim. (Cl. 166—27)

This invention relates to improvements in the method of placing cement plugs or bridges in oil wells to seal off water or gas horizons which tend to contaminate the producing sands. In the drilling of an oil well the hole passes through many different types of earth formations, some hard and relatively impervious, others soft and porous, while others or sometimes the soft layers may contain water or gas which seep into the well contaminating the oil and causing difficulty for other reasons than from dilution or contamination, such as caving or otherwise deforming the well walls, and causing corrosion of the casing and tubing used for producing the well where the gas has a high sulfur content.

Many methods have been resorted to to seal off objectionable contaminants from the producing horizons by the placing of sealing materials opposite the formations in which the contaminants occur and thereby attempting to seal off the objectionable formation to prevent the contaminants mixing with the oil being produced.

It is common practice to place a cement plug at any desired location in the well bore by means of a wash-pipe through which cement is pumped into the well and placed at the selected location. As described in the patent to Pew 2,087,297, dated July 20, 1937, the formation in which the plug or bridge is to be placed is cleaned by means of hydraulic pressure. Halliburton, according to Patent No. 2,014,563, dated September 17, 1935, plugged or bridged a well leaving a portion of the wash-pipe embedded in the cement because of the difficulty of extracting the pipe prior to setting of the cement plug. Shepler, No. 2,206,677, dated July 2, 1940, Wright 2,392,352, dated January 8, 1946, and Hall 2,220,237, dated November 5, 1940, all recognized the importance of abrading the well wall where the cement is to be placed in order to get a better bond between the cement and earth formation.

The present improvement has to do primarily with the placing of a cement plug or bridge to seal off a selected formation, the sequence of steps being arranged to first accurately locate the cement bridge, then clean the formation in order to get a bond between the cement and the well wall while keeping both the wall of the well and the pipe through which the cement is to be placed clean of cement to facilitate removal of the pipe after the cement has been placed and, finally, providing reverse circulating of the well fluids to remove cement slurry both from the well bore and the supply pipe after the plug or bridge has been set.

An object, therefore, of the invention is to provide a method for accurately placing a cement plug or film at a predetermined location in the well bore.

Another object is to obtain an intimate bond between the cement and the formation which is being sealed off.

Still another object is to keep the cement supply pipe clean of cement throughout the zone where the plug is being placed and while it is being placed to prevent sticking of the pipe in the plug after placing of the cement.

A further object is to provide a method whereby reverse circulation of the well fluid is practiced after the cement plug or film has been placed to remove excess cement slurry from the well bore and tubing, thereby eliminating subsequent difficulties which may arise, such as getting out of the hole or in resuming circulation of the well fluid after the cement has been placed.

Other objects and advantages will be apparent from the description which follows.

In the accompanying drawings which form a part of the specification and are to be read in conjuntcion therewith, there is shown an embodiment of the invention by a sequence of figures in which like reference numerals indicate like parts in the various views.

Fig. 3 is a cross-sectional view of the well at the time of placing the cement plug.

Fig. 4 is a cross-sectional view of the well at the time of reverse circulation to clear the well bore and tubing of cement slurry after the plug or bridge has been placed.

Figure 5:
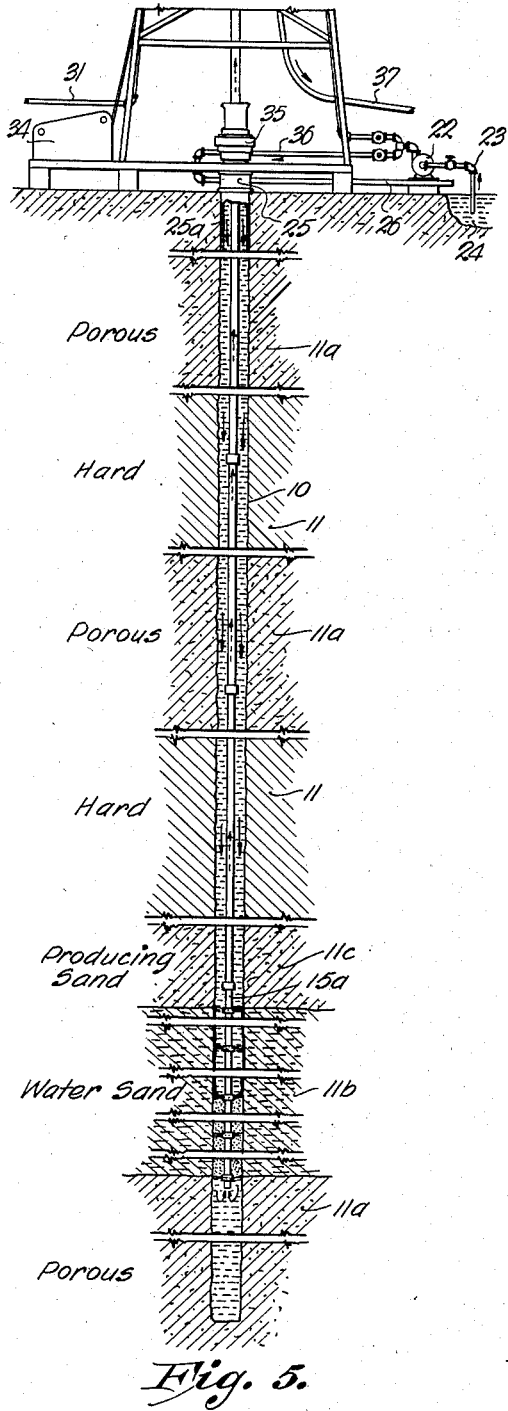

Fig. 5 is a cross-sectional view of a well in which a film is being placed, the stage of the process being that following Fig. 3 wherein the plug has been set opposite the formation to be sealed, as in Fig. 3, and, additionally, reverse circulation has been begun with the pipe still positioned opposite the formation to be sealed whereby to drive the cement out of the annulus between the pipe and the well bore except for the film which is shown in heavy lines at the face of the formation.

Figure 6:
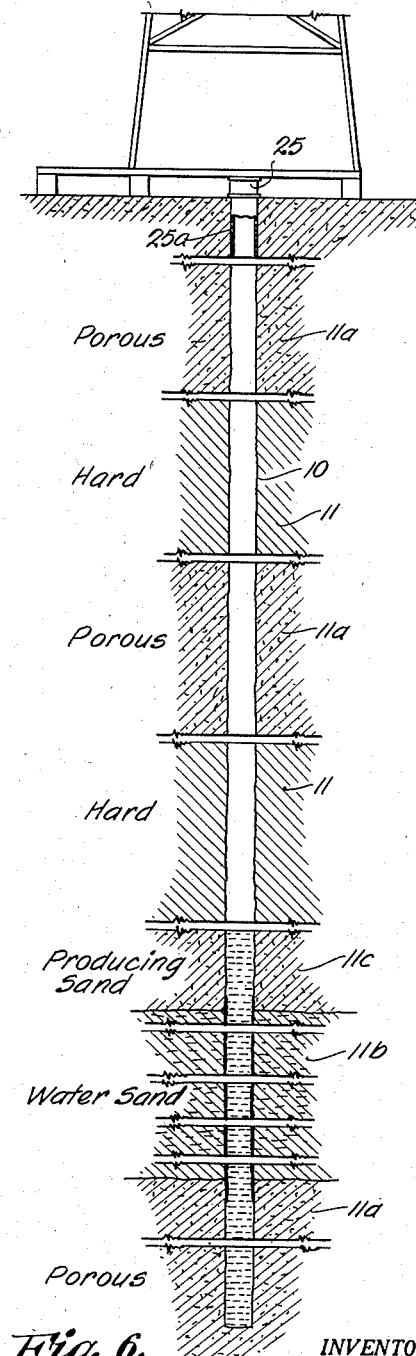

Fig. 6 is a cross-sectional view of the well after removal of the pipe after reverse circulation showing the sealing cement film positioned across the face of the formation to be sealed.

Referring to the drawings, the well bore is designated by the numeral 10, and the different types of earth formations by the numerals 11, 11a, 11b, and 11c. Arbitrarily, the hard formations are marked with the numeral 11, the porous formations with the numeral 11a, the water sand to be sealed off by the numeral 11b, and the producing sand by the numeral 11c.

At the surface is shown the lower portion of a derrick 12 upon which are hung cable 13 and block or pulley 14 which form the tackle for running the pipe or tubing 15 into or out of the well bore. Tubing 15 is attached to the block 14 by elevators 16 while back pressure valve 17 is mounted at its upper end. A plurality of scratchers or abrading members 18 are mounted upon the lower portion of the pipe or tubing between lugs which serve as stops or abutments permitting the scratchers to slide longitudinally of the pipe and also freely rotate thereon. The lugs or stops which may also be the pipe joints are located at the extremities of the zone to be cleaned and between the scratchers so they may slide along the surface of the pipe during the cleaning of the well bore scraping the pipe surface clean of accumulations of mud or cement throughout this zone. The scratchers have an outside diameter greater than the diameter of the well bore so the free ends of the wires or tines scratch and abrade the well bore when the pipe or tubing is reciprocated during the cleaning operation. Another service which the scratchers perform is a stirring and mixing action which keeps the solid particles of the mud and cement slurry from settling out.

The scratchers are located over the entire length of the pipe opposite and corresponding to the zone of the well bore that is to be cleaned, so when the tubing is lowered into the well, the scratchers will abrade the formation throughout the zone where the cement plug or bridge is to be placed. As previously suggested, the scratchers must be mounted upon the pipe in a manner which will permit them to slide along the pipe between the lugs so the collars upon which the wire abrading elements are fastened scrape the exterior surface of the pipe continuously during manipulation of the pipe in the hole, thus preventing accumulation or adhesion of material upon the outer surface of the pipe. This is of especial importance when the cement is being placed, for at that time accumulation of cement will tend to set more rapidly on the pipe surface and give difficulty when it is withdrawn from the plug or bridge. For convenience in differentiating that portion of the pipe or tubing upon which the scratchers are mounted from the remainder which extends to the ground level, the former will be designated as the abrading extension 15a.

Figure 2:
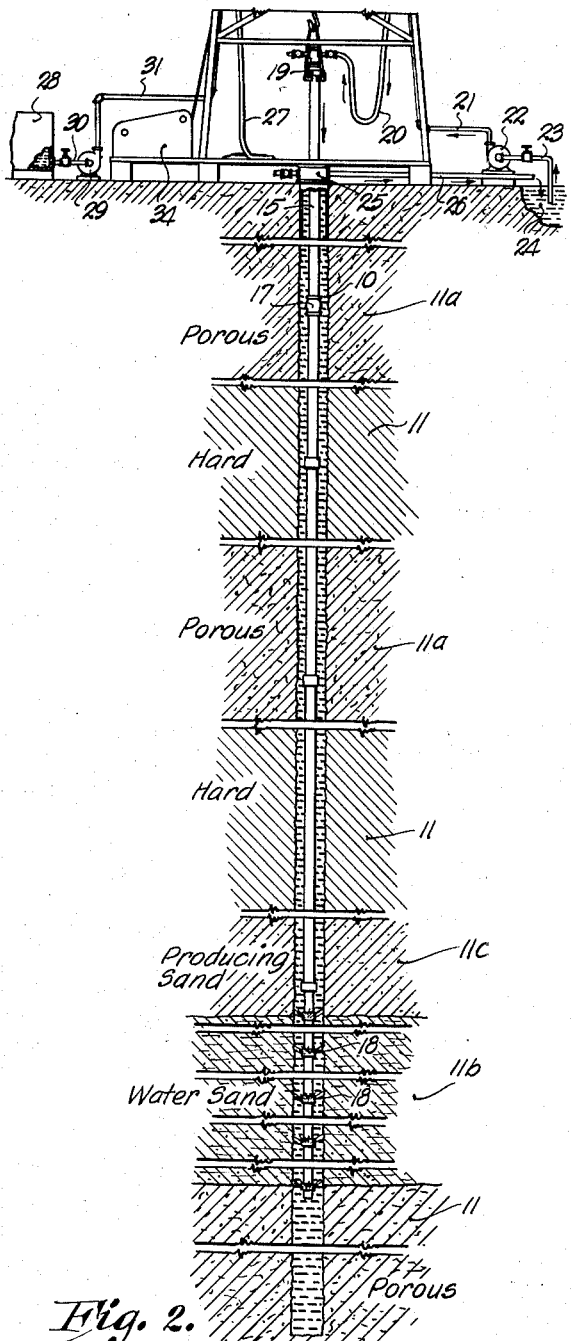
Fig. 2 is a cross-sectional view of the well with a pipe or tubing connected to the mud pump during cleaning of the well bore at the formation to be plugged or sealed.

In Fig. 2 the back-pressure valve 17 has been interposed in the tubing and the tubing lowered to a position where the scratchers are opposite the water sand where the plug is to be placed. A circulating head 19 has been connected onto the upper end of pipe 15 and hose connection 20 has been made with pipe 21 and mud pump 22. The mud pump takes suction through pipe 23 with a source of circulating fluid contained in the mud pond 24. The well head 25 likewise is connected to the mud pond by pipe 26, so mud can be circulated from the pond 24 into tubing 15 through circulating head 19, out of the bottom of the tubing and upwardly through annular space between the tubing and well bore and back to the pond.

In Fig. 3 the circulating head 19 at the top of the tubing or wash-pipe is now shown connected both with the mud pump 22 through hose 20 and with the source of cement through a hose 27. The source of the cement slurry may be a tank or truck, diagrammatically shown at 28 in Fig. 2, from which the cement is circulated by pump 29 through pipes 30, 31 and hose 27 to the circulating head 19. Valves 32 and 33 control the introduction of mud and cement through the hose connections 20 and 27, respectively. A draw-works or power source, diagrammatically shown at 34, has connections through cables with the crown block of the derrick to operate the tackle used to raise and lower the pipe into and out of the well bore.

In Fig. 4 a blowout preventer 35 is shown mounted above the derrick floor on top of the casing 25a prior to performing reverse circulation which removes excess cement slurry after the cement plug has been placed, from both the well bore and wash-pipe.

Figure 1:
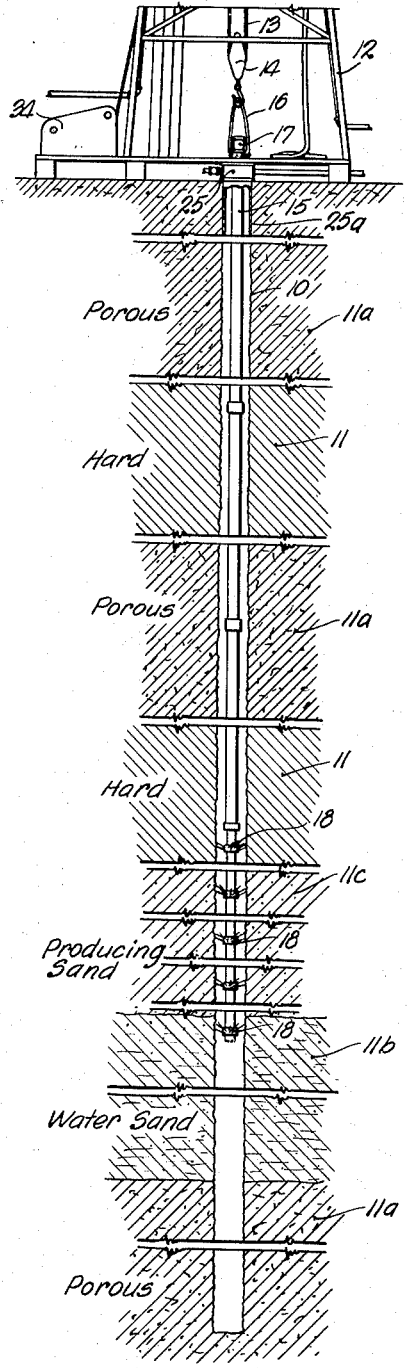
Fig. 1 is a cross section of a well showing the step of locating a back-pressure valve in the pipe or tubing through which the cement plug is to be placed.

Describing now the operations which are contemplated in placing the bridge, plug and cement film used to seal off formations containing water or gas which would contaminate the oil production, there will first be explained the operation of placing a plug through a water sand 11b. To begin with, the water sand is accurately located in the well bore and the depth or thickness of the water sand determined. A pipe or tubing with an abrading extension at its lower end, is lowered into the well so the bottom of the abrading extension is substantially at the top level or extends a short distance into the water sand. At this juncture a back-pressure valve is mounted on the upper end of the tubing, as shown in Fig. 1. Prior to lowering the abrading extension into the well, scratchers have been mounted over a zone or surface somewhat greater than the depth of the water sand to be sealed. These scratchers, as previously noted, are slidably and rotatably mounted between the pipe joints and lugs welded around the outer surface of the stinger so the collars of the scratchers have free movement longitudinally along the exterior of the abrading extension to scrape the surface clean of any accumulations which tend to form thereon.

After the back-pressure valve 17 has been connected onto the top of the tubing, as shown in Fig. 1, a length of pipe corresponding to the thickness of the water sand is added to the tubing at the surface above the valve. At the top of this added section is connected the circulating head 19, as shown in Fig. 2. Hose 20 through which mud is circulated is connected to the circulating head, and the abrading extension is then lowered into the well bore to the depth of the added pipe above valve 17. This locates the abrading elements or scratchers opposite the water sand where the plug is to be placed. In this position the abrading extension is reciprocated upwardly and downwardly in the well bore by means of the draw-works 34 and tackle connected to the upper end of the tubing, while mud is circulated from the mud pond 24 through the tubing, abrading extension and back to the pond through the annular space surrounding these tubes. The scratchers operating on the well bore in the zone of the water sand remove the filter cake or mud cake accumulated during the drilling operations. The filter cake dislodged by the scratchers is floated off in suspension with the circulating mud and is separated from the mud by screening at the surface. Reciprocation of the abrading extension and abrading of the well bore at the water sand is continued until the returning mud is relatively clean of mud cake removed from the well wall of the water sand.

Connection is now made at the circulating head with the cement supply by means of a hose 27. Valve 32 is then closed and valve 33 opened. Cement is now pumped into the tubing by means of the cement pump 29 in the manner shown in Fig. 3, the cement being discharged from the bottom of the abrading extension and rising in the annular space surrounding the abrading extension and tubing to a level somewhat above the top of the water sand. The amount of cement to be placed is, of course, determined from the diameter of the hole and the thickness of the water sand beforehand, and an excess of cement is introduced to assure an adequate supply to properly seal the water sand somewhat above and below its top and bottom levels. Also in determining the amount of cement to be placed, consideration is given to irregularities in the well bore. In order that a proper length of cement plug or bridge is produced to seal off the water sand, the abrading extension is lowered to a position somewhat below the bottom of the sand and sufficient cement is introduced to raise the top level of the plug above the top of the sand. While the cement is being introduced and placed the abrading extension is reciprocated to prevent settling out of the cement and to obtain uniform distribution of the cement particles throughout the cement slurry.

After the cement has been introduced into the tubing a connection is made with a gauge tank containing a measured amount of fluid corresponding substantially to the volume capacity of the tubing 15 and abrading extension 15a. This measured amount of fluid is then charged into the tubing behind the cement forcing it out of the bottom of the abrading extension and into the well bore where it rises in the form of an annular column opposite the water sand to a height somewhat above the top of the sand. The fluid used for placing the cement is preferably somewhat lighter than the circulating mud to minimize the likelihood of shifting or disintegration of the plug or bridge when the stinger is raised above the plug preparatory to removal of excess cement slurry. The importance of the weight factor of the fluid will be appreciated since the differential weights of the column inside and outside of the tubing will set up a fluid flow into or out of the abrading extension, whichever column is the heavier, and in doing so may disintegrate or cause shifting of the cement plug which has just been placed. Movement of the columns inside and outside of the tubing may also be effected by the inertia set up by the displacement of cement slurry when the abrading extension is withdrawn from the plug. Back-pressure valve 17 is an important factor in preventing shifting of the columns inside and outside of the pipe, since movement of the fluid upwardly through the tubing is prevented by the use of this valve.

After the abrading extension has been raised to a position above the top of the plug and above the upper level of the water sand, the back-pressure valve 17 is removed from the string, the blowout preventer 35 is mounted on the top of the casing 25a at the surface and a connection is made at the well head by means of pipe 36 to mud pump 22. A hose connection 37 leading to a disposal reservoir is substituted for the hose 20 and cement hose 27 is disconnected from the circulating head with valve 33 closed. Mud is now pumped from the pond 24 by means of pump 22 through the connection 36 into the casing and the annular space surrounding pipe 15. This mud flows downwardly through the well bore and forces the fluid contained in the abrading extension and tubing upwardly to the circulating head, where it is discharged through pipe 37 into a separate container or disposal reservoir not shown. The purpose of the blowout preventer 35 is to maintain a seal between the tubing 15 and the casing at the well head when back-pressure is imposed upon the casing during the reverse circulation cycle of the fluid to remove excess cement slurry contained in the well bore abrading extension and tubing.

It is contemplated as well that a film of cement instead of a plug may be imposed upon the well bore in a formation or sand containing contaminants such as water or gas, and in doing so the procedure suggested with respect to placing the bridge or plug would be followed except after the cement plug had been placed the abrading extension would not be raised above the plug, as indicated in Fig. 4. In the procedure of placing the film of cement the abrading extension would remain in the position shown in Fig. 3, and connections would be made at the surface as shown in Fig. 4. Reverse circulation set up under these conditions would remove the well fluids, including the cement slurry of which the plug is formed out of the hole. This type of operation would leave on the well bore at the water sand a cement film which would set to form a relatively impervious layer or seal and would avoid the necessity of drilling out the plug in the event other producing horizons lay below the water sand.

While the back-pressure valve is shown in the various views it is contemplated as well that the back-pressure valve may be omitted under certain circumstances, but where the back-pressure valve is omitted greater care must be taken in the balancing of the fluids inside and outside the pipe in order to prevent disintegration or shifting of the plug due to the flow of fluid into or out of the abrading extension due to the differential weights of the columns of fluid. The back-pressure valve would, of course, be of less importance where only a film of cement is being applied to the formation being sealed off, since the movement of the fluids under those conditions is of little consequence to the placing of the cement.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

A method of placing a cement film of predetermined length at a selected location in a well bore to seal off a portion of the face of the well bore, said cement film adapted to minimize the loss of circulating fluid and seal off contaminants from the oil producing zone, comprising the steps of mounting abrading elements on the lower portion of an open ended pipe for a distance corresponding to the length of the portion of the formation to be sealed off, lowering the pipe into the well bore to a depth corresponding to the lower edge of the portion of the formation to be sealed off, reciprocating the pipe to cause movement of the abrading elements to clean the well wall in the zone in which the abrading elements are mounted while circulating fluid downwardly through the pipe and upwardly in the annular space surrounding the pipe to carry off removed filter cake, thereafter introducing a cement slurry in an amount required by the depth of the portion of the formation to be sealed off while reciprocating the pipe to uniformly deposit the cement opposite the formation to be sealed, leaving the pipe opposite the formation to be sealed off with its lower end at least opposite the lower boundary thereof, then reverse circulating a fluid downwardly through the annular space surrounding the pipe to clear the pipe, the annulus between the pipe and the well bore wall of substantially all cement slurry yet leaving a film deposited on the well bore wall, then removing the pipe and permitting the film imposed upon the bore to set.

References Cited in the file of this patent

UNITED STATES PATENTS

| | | |
|---|---|---|
| 2,163,449 | Owsley et al. | June 20, 1939 |
| 2,308,072 | Granger | Jan. 12, 1943 |
| 2,392,352 | Wright | Jan. 8, 1946 |
| 2,644,527 | Baker | July 7, 1953 |